D. L. GARVER.
Seed-Drill and Cultivator.
No. 206,780. Patented Aug. 6, 1878.
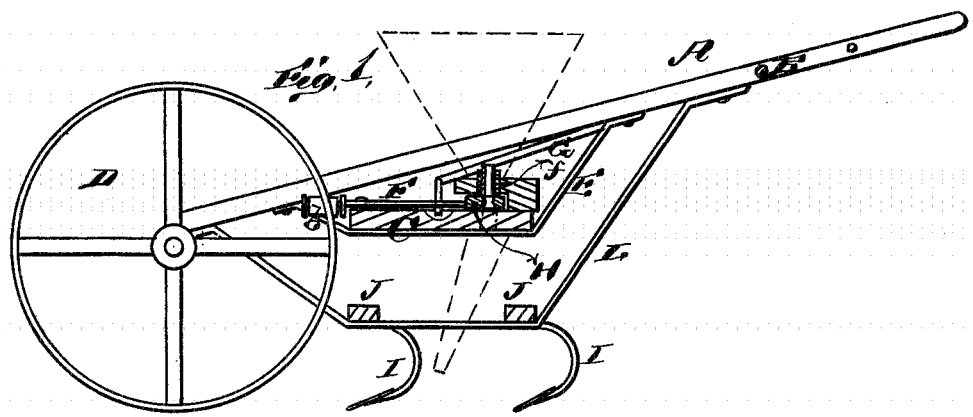
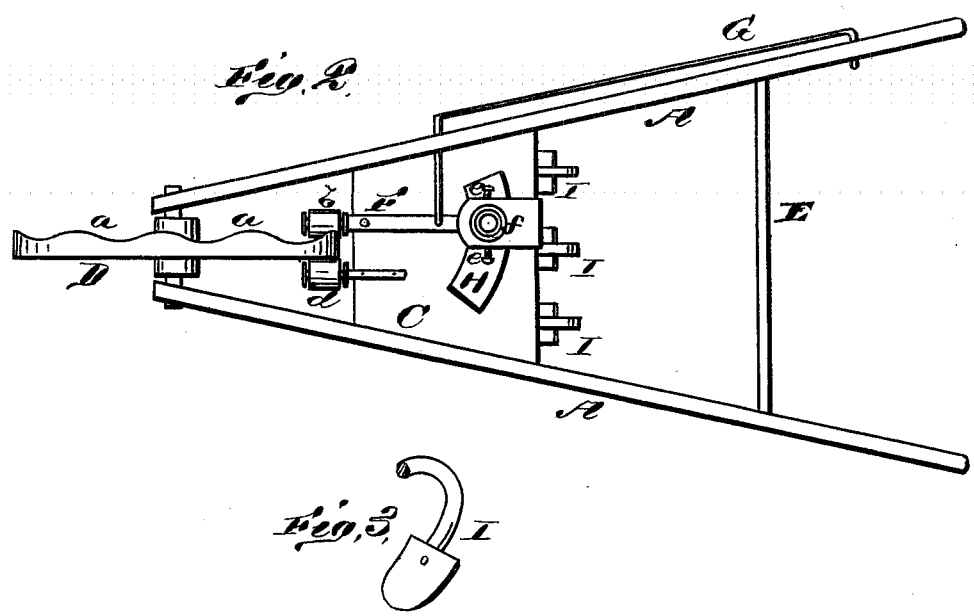

UNITED STATES PATENT OFFICE.

DAVID L. GARVER, OF HART, MICHIGAN.

IMPROVEMENT IN SEED-DRILLS AND CULTIVATORS.

Specification forming part of Letters Patent No. 206,780, dated August 6, 1878; application filed April 27, 1878.

*To all whom it may concern:*

Be it known that I, DAVID L. GARVER, of Hart, in the county of Oceana and State of Michigan, have invented a new and valuable Improvement in Seed-Drills and Cultivators; and I do hereby declare that the following is a full, clear, and exact description of the construction and operation of the same, reference being had to the annexed drawings, making a part of this specification, and to the letters and figures of reference marked thereon.

Figure 1 of the drawings is a part-sectional side view of my seed-drill and cultivator. Fig. 2 is a plan view, and Fig. 3 is a perspective detail, thereof.

The nature of my invention consists in the construction and arrangement of a combined seed-drill and cultivator to be used by hand or by horse power, as will be hereinafter more fully set forth.

The annexed drawing, to which reference is made, fully illustrates my invention.

A A represent two inclined and diverging side beams, which form the handles of the machine, said beams being connected by a round, B. C is the seed-drill platform, suspended under the beams A A by stirrups or bent metal bars E E. Between the front ends of the beams A A is mounted the wheel D, which has its rim scalloped, as seen at *a*, on one side, for the purpose of playing against the side of the end of a pivoted lever, F, said lever having on its front end a roller, *b*, which is caused to oscillate against the scalloped side of the wheel by the revolving of the wheel and the operation of a spring-lever, G, which holds the roller against the wheel.

The rear end of the pivoted lever F is attached to a shuttle or slide, H, which is to play to and fro under a hopper containing seed. When the roller *b* passes a scallop, *a*, on the wheel the shuttle is passed under the hopper, and a hole in the shuttle is filled with seed, and the shuttle is then carried to a corresponding hole below, which connects with a tube to conduct the seed to the ground.

For the purpose of holding the wheel in its proper position a roller, *d*, is arranged to play against the opposite edge of the wheel-rim.

*f* is a rubber tube used in contact with the upper side of the shuttle H, and held in position by set-screws *e e*. This rubber is used for the purpose of preventing friction and clogging and to separate the seed in the shuttle from the seed in the hopper when the shuttle passes out.

The spring-lever G is attached near the upper end of one of the beams or handles A, and extends downward and connects with the pivoted lever F for the purpose of acting in conjunction with the scalloped wheel-rim in producing the oscillations of the shuttle, as described.

When the machine is to be used as a cultivator the platform C is removed, and teeth I I are fastened to cross-bars J J, which are secured on stirrups L L fastened to the under sides of the beams A. The outside teeth are used with the seed-drill also; and in changing to a cultivator the intermediate ones are attached.

The teeth I are formed in the shape of a half-circle, which is the best form to pass through the ground with the least possible resistance. If made to run with points more horizontal it has a tendency to come out of the ground, and if the tooth stand more perpendicular it encounters greater resistance. These teeth are formed of spring-steel for the purpose of yielding sufficient to prevent battering the edge when they come in contact with stone, and for the purpose of greater strength with less weight.

What I claim as new, and desire to secure by Letters Patent, is—

In a hand seed-drill, the combination of the wheel D, having its rim *a* scalloped on one side, the pivoted lever F, with roller *b*, and a rigid guide-roller, *d*, on the opposite side, the shuttle H, and spring-lever G, all constructed substantially as and for the purposes set forth.

In testimony that I claim the above I have hereunto subscribed my name in the presence of two witnesses.

DAVID L. GARVER.

Witnesses:
MARCUS H. BROOKS,
JOSEPH TYEN.